No. 631,394. Patented Aug. 22, 1899.
W. H. BRADSHAW.
FIFTH WHEEL FOR VEHICLES.
(Application filed Apr. 22, 1899.)

(No Model.)

WITNESSES:

INVENTOR
William H. Bradshaw.
BY
ATTORNEYS

UNITED STATES PATENT OFFICE.

WILLIAM H. BRADSHAW, OF ORANGE, NEW JERSEY.

FIFTH-WHEEL FOR VEHICLES.

SPECIFICATION forming part of Letters Patent No. 631,394, dated August 22, 1899.

Application filed April 22, 1899. Serial No. 714,047. (No model.)

*To all whom it may concern:*

Be it known that I, WILLIAM H. BRADSHAW, of Orange, in the county of Essex and State of New Jersey, have invented a new and useful Improvement in Fifth-Wheels for Vehicles, of which the following is a full, clear, and exact description.

The object of the invention is to provide a fifth-wheel for vehicles in which lightness and durability will be combined with cleanliness of construction and wherein friction will be reduced to a minimum.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
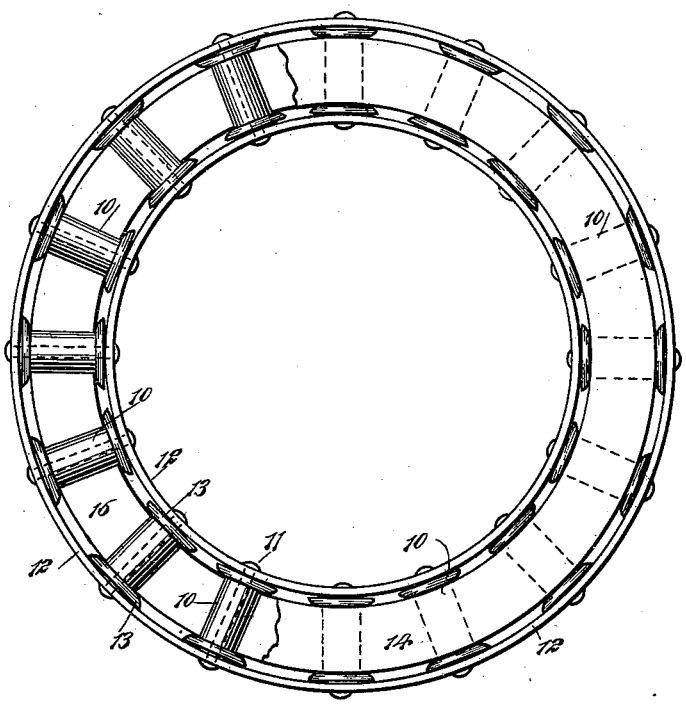
Figure 2:
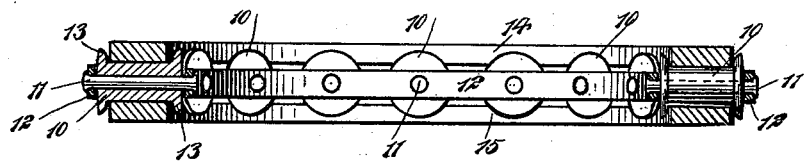
Figure 3:
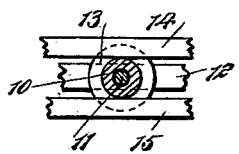

Figure 1 is a plan view of the improved wheel, a portion of the upper track being broken away. Fig. 2 is a transverse section through the complete wheel; and Fig 3 is a transverse section through one of the rollers, showing a portion of the tracks and adjuster in side elevation.

Rollers 10 are mounted to turn loosely upon spindles 11, secured in an adjuster, which consists, preferably, of narrow circular strips 12 of metal, and said rollers are provided at or near each end with an annular flange 13. These flanges may have a flat peripheral surface; but usually the inner or opposing faces of the flanges are beveled and the inner ends of the rollers are preferably flat, while their outer ends are in a measure convexed, thus facilitating their rotation upon the spindles when the walls of the adjuster are brought close to the ends of the rollers, as they should be.

Two ring tracks 14 and 15 are employed in connection with the rollers and their adjuster. One of these tracks rests upon the upper surfaces of the rollers 10, while the other track is in contact with the bottom surfaces of said rollers, and the tracks are of such width that their under and upper surfaces respectively engage with the rollers and their inner and outer sides are near to the flanges of the rollers. Under this construction it is obvious that the rollers serve not only as bearings for the tracks, but likewise act as guides therefor, and it is evident that a wheel constructed as set forth will be very cleanly and effective in operation, it being understood also that the rollers may be grouped together as closely as may be desired or may be spaced as far apart as occasion may demand.

The entire structure possesses durability, as has been stated, and lightness, two factors that are very essential in the construction of a fifth-wheel for a vehicle.

Having thus described my invention, I claim as new and desire to secure by Letters Patent—

1. In a fifth-wheel a series of flanged rollers spaced to travel in a circle, an adjuster for the rollers, and tracks with which the rollers engage, the rollers serving as guides for the tracks.

2. In a fifth-wheel, a series of rollers spaced to travel in a circle, the rollers being provided with flanges at their ends, spindles through the rollers, and an adjuster for the spindles, the said rollers being adapted for engagement with tracks, as and for the purpose specified.

WILLIAM H. BRADSHAW.

Witnesses:
J. FRED. ACKER,
EVERARD BOLTON MARSHALL.